US012792832B1

(12) United States Patent
Muise et al.

(10) Patent No.: US 12,792,832 B1
(45) Date of Patent: Nov. 10, 2026

(54) DISPLAY SCREEN CONTENT ANALYSIS

(71) Applicant: Screenlake, Inc., San Mateo, CA (US)

(72) Inventors: Daniel Muise, San Mateo, CA (US); Justin Cornelius, San Mateo, CA (US)

(73) Assignee: TAR HEEL CAPITAL PATHFINDER MT LIMITED, Sliema (MT)

( * ) Notice: Subject to any disclaimer, the term of this patent is extended or adjusted under 35 U.S.C. 154(b) by 97 days.

(21) Appl. No.: 18/763,999

(22) Filed: Jul. 3, 2024

(51) Int. Cl.
*G06F 40/279* (2020.01)

(52) U.S. Cl.
CPC .................................. *G06F 40/279* (2020.01)

(58) Field of Classification Search
USPC ...................................................... 704/1–504
See application file for complete search history.

(56) References Cited

U.S. PATENT DOCUMENTS 9,760,871 B1 * 9/2017 Pourfallah ............. G06Q 10/10
10,115,087 B2 * 10/2018 Pourfallah ......... G06Q 20/3274
10,277,953 B2 * 4/2019 Engineer .......... H04N 21/47217
11,080,336 B2 * 8/2021 Van Dusen ............ G06Q 10/10
2002/0151992 A1 * 10/2002 Hoffberg ............ G05B 19/0426 700/86
2011/0013756 A1 * 1/2011 Davies .................... G10L 15/22 379/88.14
2012/0020465 A1 * 1/2012 Davies .................... G10L 15/22 379/88.07
2012/0166429 A1 6/2012 Moore
2012/0253852 A1 * 10/2012 Pourfallah ........... G06Q 20/327 705/41
2013/0179150 A1 7/2013 Eriksson
2013/0241952 A1 9/2013 Richman
2013/0346302 A1 * 12/2013 Purves ................. G06Q 20/102 705/40
2015/0229686 A1 8/2015 Stiers
2015/0350139 A1 12/2015 Speer
2017/0270203 A1 9/2017 Liu
2018/0025334 A1 * 1/2018 Pourfallah ............. G06Q 20/14 705/41
2019/0286734 A1 9/2019 Kao
2023/0117244 A1 * 4/2023 Cassidy .................. G06F 40/40 704/9
2023/0223026 A1 * 7/2023 Grichnik ............... H04L 51/216 704/235
2024/0127857 A1 4/2024 Caba Heilbron
2024/0412542 A1 * 12/2024 O'Neill ................. G06F 16/435

FOREIGN PATENT DOCUMENTS

AU 2013206449 A1 * 1/2014 ............. G06Q 30/04
AU 2019200041 A1 * 1/2019 ............. G06Q 30/04
EP 0702322 A2 * 3/1996 ........... G06V 30/414
EP 0702322 B1 * 2/2002 ........... G06V 30/414
JP 2026504033 A * 2/2026 ............. G06F 9/453

* cited by examiner

*Primary Examiner* — Marcus T Riley
(74) *Attorney, Agent, or Firm* — Mahamedi IP Law LLP

(57) ABSTRACT

A system that operates on an end user device to analyze display screen content for term encounters. The term encounters can be identified in content generated by any one of many applications which users utilize day-to-day when using their respective device.

17 Claims, 6 Drawing Sheets

DISPLAY SCREEN CONTENT ANALYSIS

TECHNICAL FIELD

Examples pertain to a system and method for performing display screen content analysis.

BACKGROUND

End user computing devices (e.g., mobile device, tablet, laptop, desktop, browser-enabled devices, etc.) often utilize display screen analytics to determine information about how computing devices are used. In the past, display screen analytics have been used to measure user screen time (e.g., the number of hours a person has used their device) and gauge device usage (e.g., what applications a user has used the most). Display screen analytics can be used to gauge, for example, when to initiate a screen saver, implement a power reduction mode, and/or generate an alert or user notification. Over time, additional applications have been developed that utilize, directly or indirectly, display screen content of user devices. These applications have included, for example, content filtering (e.g., parental controls), providing accessibility features for impaired users, and augmenting user services that are made available on user devices.

DETAILED DESCRIPTION

Figure 1:
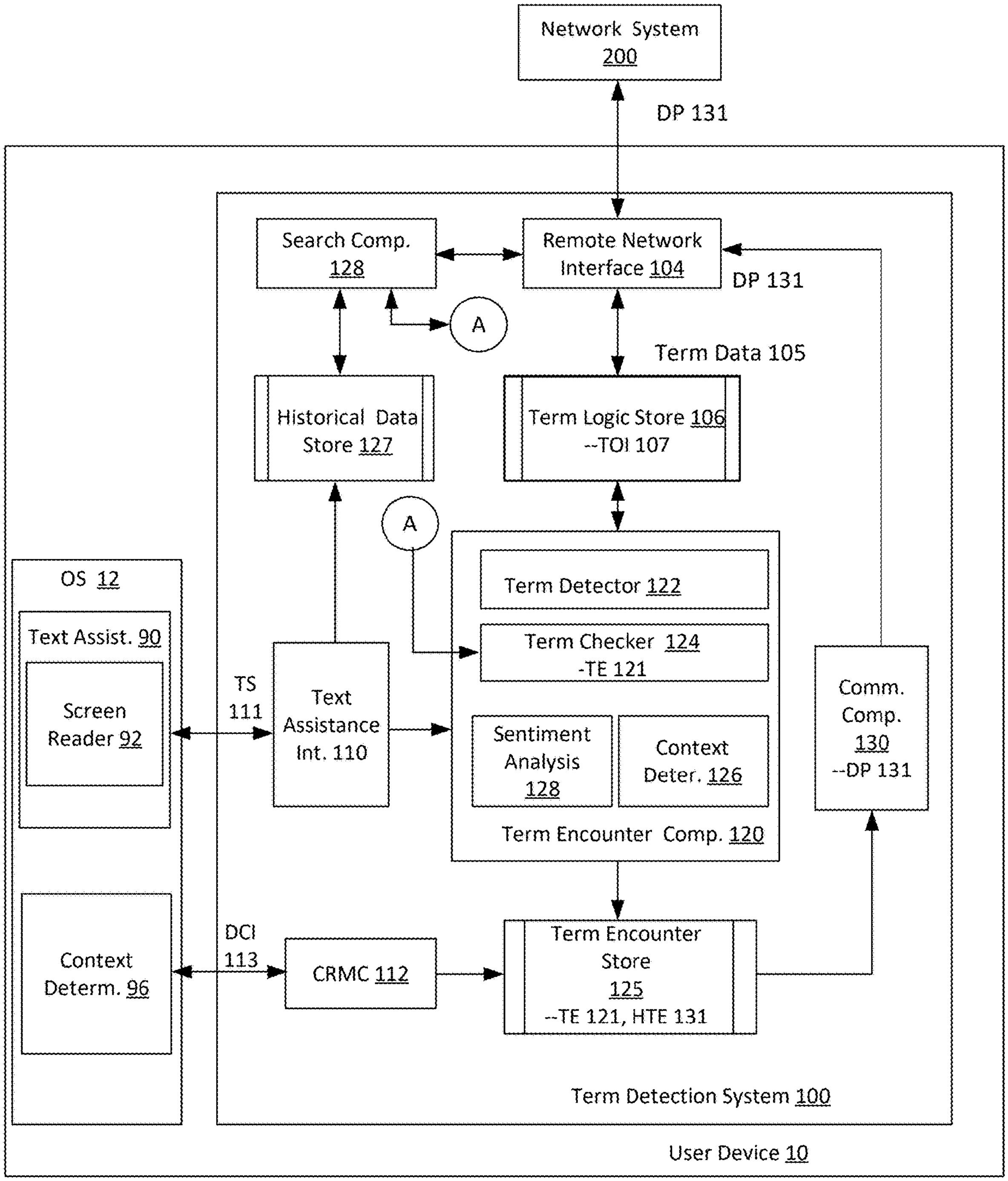
FIG. 1 illustrates an example term detection system for a user device or system, according to one or more embodiments.

Examples include a text detection system that operates on an end user device to determine term encounters of interest in content that is rendered on the user device. The term encounters can be identified from display screen content, generated by any one of many applications which users utilize day-to-day when using their respective device. More particularly, examples provide that term encounters can be identified from virtually any content that is displayed on the user device or rendered through other mechanisms.

In examples, analytics are determined for individual end user devices, where the analytics relate to the occurrence of terms of interest in the display screen content of the respective end user devices. Such display screen content analytics can be determined and used in a manner that is secure, anonymized to the end user, and with minimal impact to the performance of the end user devices.

Examples provide for term encounters can be identified and recorded on the user device in connection with the user device rendering content generated by any one of a plurality of application, such as a web browser, an email client, a messaging application, social media application, note application, calendar, shopping application, or the like. The term encounters can be identified and aggregated while maintaining complete anonymity of the user.

Examples further provide for a user device to aggregate instances of term encounters, and to export information about the instances in a manner that is anonymized, private and secure, without affecting the performance of the user device. The term encounter information can be aggregated from a population of users to provide various insights related to brands, products and the like.

Examples further provide for a user device to store a term collection in a memory resource of the computing device, where the term collection includes a collection of terms of interest. The user device can be operated to obtain a text stream that is a transcription of content displayed on the user computing device. The text stream is analyzed to determine whether any of the terms of interest are encountered in the text stream. Each term of interest that is encountered in the text stream is recorded with an export data store, such that the terms of the term encounter are recorded without recording at least some other terms of the text stream.

Still further, in some examples, a text stream generated by a screen reader that operates on a computing device, where the screen reader generating the text stream in connection with a display component of the computing device rendering one or more content items during a user session. The user device implements processes to determine each instance in which at least one term of interest matches to a corresponding portion of the text stream. The user device records an entry for each determined instance, where each recorded entry identifies the matched term of interest. Further, the user device generates communication for a remote computer system that identifies each recorded entry.

In additional examples, a user device operates to receive a term of interest from a remote computer system. A screen reader on the user device generates a text stream that corresponds to a transcription of a corresponding content displayed by the user device. The user device determines an instance in which the term of interest matches to a portion of the text stream. The user device generates a communication for the remote computer system that includes information about the determined instance.

Still further, in examples, a network system is provided that operates to transmit, over one or networks, to each user device of a plurality of user devices, a set of terms of interest. The network system further operates to enable each user device to analyze text streams, generated as transcriptions of content displayed on the user device, to (i) identify instances when individual terms of interest of the set are encountered in corresponding text streams generated from a corresponding content displayed on the user device at a given time; and (ii) for each identified instance, determine contextual information regarding the corresponding text stream and/or corresponding content displayed on the user device. The network system receives, over one or more networks, one or more communications from each user device of the plurality of user devices, where the one or more communications from each user device includes (i) data that identifies a respective instance when a corresponding term of interest is encountered in a corresponding text stream that is generated on the user device as a transcription of a displayed content; and (ii) for each identified instance, contextual information that is determined for the corresponding text stream and/or corresponding content displayed on the user device. The network system maintains a term encounter data store that records, for each term of interest of the set, (i) each instance the term of interest is matched by one of the plurality of user devices, and (ii) the contextual information that is determined for that instance.

Embodiments leverage the use of display screen content of end user devices (e.g., multifunctional telephonic devices, such as so called "smart phones" or "feature phones") which are increasingly integral to daily activities that users perform. These activities can include communications with friends/family, consumption of news and content, performing tasks, socializing, working etc. Embodiments recognize that content rendered on these devices can reflect and be influenced by user awareness, interests, and their respective activities. For example, in context of brand awareness, display screen content can reflect what brands the user sees, follows, researches, shops for, talks about or engages on social media. As described with examples, embodiments enable the display screen content to be analyzed in a manner that is anonymized and secure, for purpose of identifying term encounters for terms of interest (e.g., brands and products). Further, embodiments enable display screen content to be analyzed using processes that require minimal computing resources, meaning the implementation of examples does not slow or impede the user device in its normal use.

Among other advantages, examples enable processes to utilize display screen content to measure brand awareness and name recognition in a variety of context, including processes to detect when brands or names are referenced in non-commercial context, (or "organic", such as with user-generated content or social media), as well as in commercial context, informational context (e.g., news). Examples improve upon conventional approaches, where, for example, users are actively engaged (e.g., through online surveys). Such conventional approaches are limited in a variety of way, including by the fact that survey respondents are generally motivated to partake in the online survey (e.g., through financial incentive, or because they have a strong opinion), resulting in a skewed outcome (e.g., users who have a strong sentiment about a brand or name are more likely to respond).

In addition to online surveys, there are numerous conventional technologies for determining brand awareness and name recognition. Another conventional approach is to use website traffic where a brand or name is provided. Measuring traffic only provides a highly granular indicator of brand awareness or name recognition, and typically, the results do not directly relate to a brand or name, but rather to a user intentionally or non-intentionally visiting a landing page of a website.

Another approach for determining brand awareness or name recognition is to analyze social media content. While social media content can reflect sentiment, the medium generally lacks depth, with the mentioning of brands being relatively sparse, unless the brand name is tied to promotional content, which can also skew results (as people who engage with promotional social media are interested in the brand or name being promoted).

Still further, another conventional approach for determining brand or name awareness is through analysis of search engine data (e.g., terms people search for, frequency, results, etc.). Search engine data has numerous shortcomings, such as, for example, its data reflects awareness/name recognition amongst a relatively small segment of the population (i.e., those individuals who search online for a particular brand or name), and it can be a source of brand/name confusion, where search results include sponsors rather than information about a particular brand or product being searched. Metrics such as sentiment, or casual interest in a brand or name are often missed by search engine data. Moreover, the brand awareness and name recognition is often tied to the ability of the brand/name owner to optimize their website traffic and promote their product.

By contrast to conventional technologies, examples provide for detecting and measuring term encounters amongst a population of users. The detection can be made across various context, including those that are organic (e.g., through user-generated content on a messaging application, rather than interaction with commercial content), meaning the determinations are not limited to motivated users who participate in surveys or search for brands/names using a search engine. Rather, the determinations can be made for all types of users, such as those who converse about a brand or name.

Moreover, much of the applications and functionality users utilize on their computing devices is provided as a result of the users being willing to view and engage commercial content, including participating in surveys. The delivery of such commercial content to end user devices consumes resources (e.g., bandwidth, power), results in unwanted disclosure of information (e.g., such as through tracking cookies that track the website a user visits), and may sometimes be a cause for security breaches on the end user devices. Embodiments as described provide a secure, private and unobtrusive mechanism for measuring brand awareness and name recognition. Further, users can opt for running a program or application as described with examples, as a mechanism that can substitute for, or mitigate against more intrusive and resource-intensive approaches that are typical in prior efforts.

As used herein, a "term encounter" means an instance when a term of interest is determined to match to a portion of a text stream that is represented of rendered media content (e.g., display screen, audio input/output, etc.).

A "user device" is any computing device operated by an end user. Examples of a user device include a mobile computing device (e.g., multifunctional cellular-telephony devices or smart phone), a wearable device (e.g., smart watch), a tablet or phablet, a laptop computer, desktop computer, virtual reality headset or the like. A user device can also include multiple discrete computing devices that can share a user profile or otherwise linked (e.g., smart watch and phone), etc.

Throughout this application, references are made to fictitious brands for purpose of illustrating in context of specific examples. The references to brands are intended to be fictional, and are not meant to be a characterization of a true or actual brand.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example term detection system for a user device or system, according to one or more embodiments. As described with examples, the term detection system 100 can be implemented on a user device 10 as an application, a program, a software tool, a software development kit, or the like. In variations, the term detection system 100 can be integrated in whole or in part as a feature of an operating system. Further, in examples, some components of the term detection system 100 can be implemented by an operating system and/or one or more third-party components. With reference to an example of FIG. 1, the user device 10 is representative of any one of a plurality of user devices on which a version of a term detection system 100 is implemented.

In examples, term detection system 100 communicates with, or otherwise utilizes resources of the computing device 10, including operating system resources 12. The operating resources 12 include text assistant component 90 and context determination component 96. The text assistant component 90 can include programs or applications that provide some form of assistance to an user through use of text-based communications. Examples of text assistant programs include screen readers. Screen readers transcribe displayed content to generate text streams that are then played back through a media player, so that the displayed content is rendered as audio to the end user. Screen readers are often used by the visually impaired as an alternative to viewing content that is displayed on a display screen of the user device. Screen readers also have applications in context of hands-free driving, where users elect to have content (e.g., emails) read to them aloud through the sound system of a vehicle.

In an example of FIG. 1, the text assistant component 90 is shown to include screen reader 92. The screen reader 92 generate a text-based representation (e.g., transcription) of content that is displayed on a display screen ("display screen content") of the computing device 10. The screen reader 92 can automatically generate a text stream that represents content displayed on the screen from any one of multiple applications that operate on the computing device 10 to display content. In particular, the screen reader 92 can generate a text stream 111 for text content included in content generated through applications that execute on the computing device 10, such as a browser, a social media application, a text messaging application, an email client, a shopping card or application, a document viewer or editor (e.g., PDF viewer, DOCX viewer, etc.), a note taking application, a task management application, a personal information management component and numerous other applications.

In some examples, the term detection system 100 generates programmatic calls to the OS 12 of the user device 10, to receive a text stream 111 from a text assistant component 90. The OS 12 can receive system calls to trigger the screen reader 92 or other text assist component 90 into communicating a text stream 111 of content being rendered (e.g., displayed on a display component) by the user device 10.

In examples, the term detection system 100 includes processes that perform operations represented by remote network service interface 104, text-assistance interface 110, context merge component 112, term encounter component 120, and remote communication service component 130. The components of the term detection system 100 are described in more detail below.

Term Logic Store

As described with examples, the term logic store 106 includes a collection of terms of interest 107. By way of examples, each term of interest can correspond to a brand, a product or service, or a name or identifier of a publicly recognizable event, figure, or program. Each term of the term logic store 106 can correspond to an entry (or record), where the entry identifies one or more primary terms by proper spelling and form. Each entry can also associate a term of interest with misspellings, phonetic alternatives (e.g., "DR" versus "DOCTOR"), common phonetic mispronunciations, nicknames and other alternatives or features. Further, an entry for a term of interest can also include one or more secondary terms that identify a particular variant for the primary term(s). In the context of a brand or product, the secondary terms can identify a particular species or variant of the brand or product. The term logic store 106 can also include logic (e.g., heuristic, rules, predictive models, etc.) for identifying term encounters, including logic to identify instances of term encounters in specific scenarios. Such logic can include term-specific or category specific logic (e.g., affecting a category of terms of use).

At least some terms of the term logic store 106 can be compound terms (e.g., "Mountain Craze" for a brand of soda). For a compound term of interest, the entry for the compound term (e.g., "Mountain Craze") in the term logic store 106 can identify a dominant primary term for the compound term as a marker. In such case, the dominant primary term can correspond to the least commonly used term (e.g., "Craze") of the compound term, in context outside of usage as a brand or name (e.g., least commonly used in context of English dictionary usage). As an addition or variation, the dominant primary term can be designated, such as by a user of a service provided by the network system 200. In some examples, the entry for the compound term of interest identifies one of the primary terms as being a dominant marker for the compound term. For example, in the case of "Mountain Craze" branded soda, the term "Craze" may be identified as the dominant marker, as "mountain" is more commonly used in context outside of the term of interest (e.g., plain English usage).

As mentioned, in some examples, the entry of a term of interest can include a set of secondary terms. The secondary terms can include descriptors of the corresponding term of interest. For example, in the case of a product, a descriptor can identify a variation (or variant) of the item identified by the term of interest. For illustration, "Sugar Free" and "Mountain Craze" can identify a product "Sugar Free Mountain Craze" soda, which is a variant to "Mountain Craze" branded soda. Similarly, "White" and "Chedder" for "Cheezey" brand crackers can be identified as "White Cheddar Cheezey" as a variant to "Cheezey" branded crackers. For "Luxure" brand of vehicles, "UX Luxure" can be a variant. The secondary terms of the variant can be specified in the term logic store 106 by an order (or sequence) and relative positioning vis-à-vis the primary terms.

In some examples, the entry for the term of interest can be associated with a product or category specific context or interest. For example, the entry for a term of interest that is a soda (e.g., "Mountain Craze" as a brand of soda) or snack (e.g., "Cheezey" as a brand of crackers) can include "unhealthy". Similarly, for a term of interest that references a vehicle, the product or category-specific context or interest can correspond to "electric".

Figure 2:
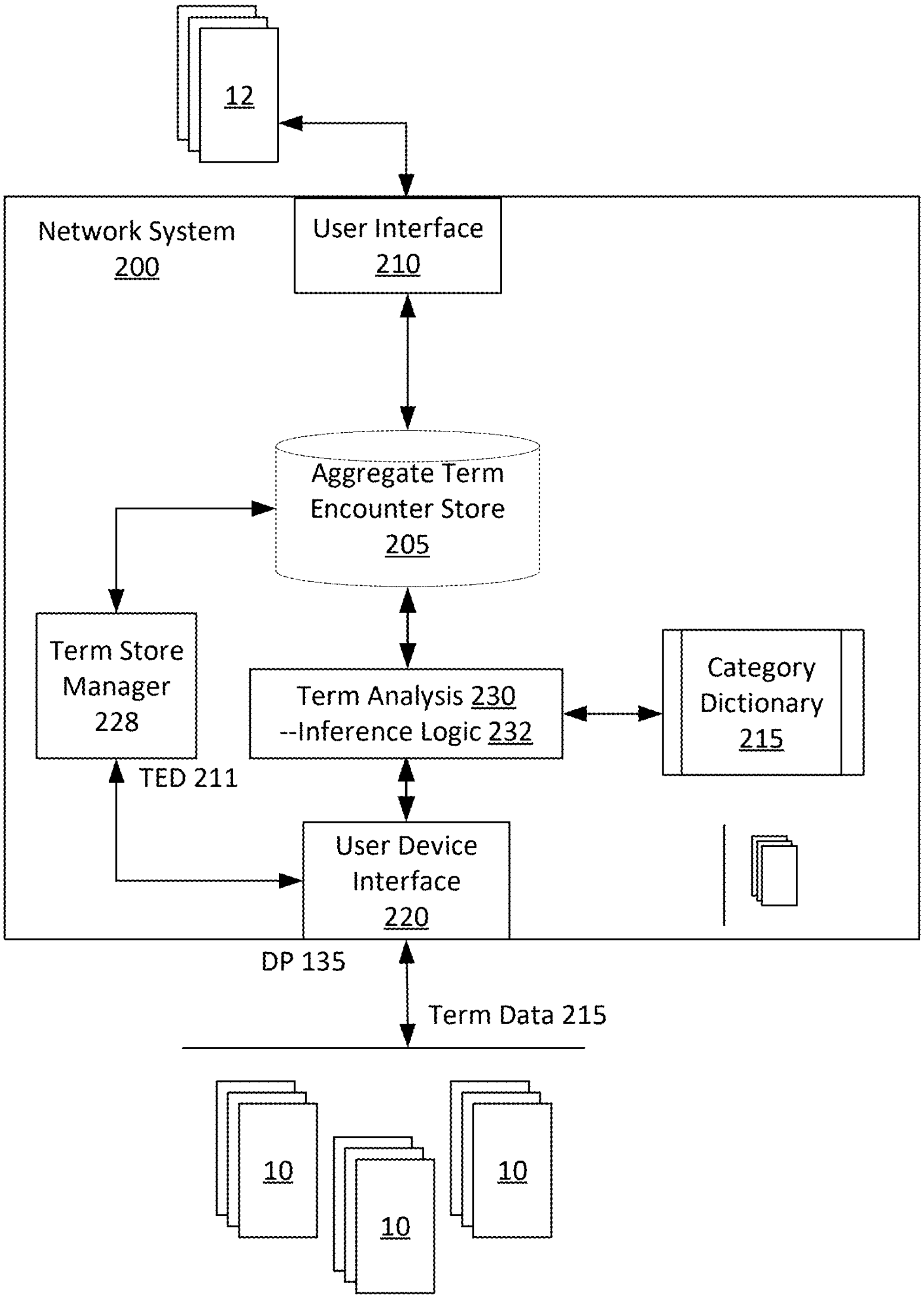
FIG. 2 illustrates an example network system 200, according to one or more embodiments.

In examples, the term logic store 106 can be established on the user device 10 by term data 105, communicated from an external source, such as the network system 200 (see FIG. 2). Further, the term logic store 106 can be updated repeatedly, to add, remove or refine the terms of interests and/or their respective entries in the term logic store 106.

As mentioned, the entries of the term logic store 106 can also include logic for determining whether the presence of a term of interest is present in a given text stream. In examples, the logic can include term-specific logic, such as may be devised for a particular term of interest, or type or category of term of interest. The logic can specify, for example, one or more proximity condition between a term of interest and a corresponding indicator text. The proximity condition can, for example, place an indicator text before or after a corresponding term of interest, and/or within a given number of words or character spacing of the term of interest or another indicator text. In some examples, the logic can specify a manner of detecting terms of interest. By way of illustration, the logic can specify a specific type of detection analysis upon the presence of a term of interest or portion thereof, where the search may define a specific set of indicator terms or text when the identified term is detected. The logic can also specify sequencing data, such as an order in which primary or secondary terms are to appear.

The network service interface 104 communicates with an external source to receive term data 105 for the term store 106. In examples, the network service interface 104 can establish a communication channel with a network system 200 to receive term data 105, where the term data corresponds to, or enables identification of terms of interest in text data 111 generated from the 90. The network service interface 104 can retrieve the term data 105 on a periodic basis, or alternatively, in responsive to designated events. In some implementations, the network service interface 104 includes a REST API or similar programmatic mechanism that enables it to seamlessly receive term data 105 as a background process. The network service interface 104 can communicate with the network system 200 at multiple instances in time to receive term data 105 and to update a term and logic library 106 using the term data.

Text Assistance Interface

The text assistant interface 110 communicates with the OS 12 to receive text data generated by the text assistant component 90. In examples, the text assistant interface 110 can perform a call to the OS 12 to receive a text stream 111 from the screen reader 92. Further, while examples provide for the text assistant interface 110 to programmatically interface with the screen reader 92 of the OS 12, in variations, the text assistant interface 110 can make calls or programmatically receive the text stream 111 from a non-OS resource, such as, for example, non-native or OS related applications (produced by other third-parties) that can also execute on the computing device 10.

Device Contextual Information

In examples, while the text assistant interface 110 receives the text stream 111, processes represented by context retrieval and merge component ("CRMC") 112 retrieve device contextual information 113 from programmatic resources of the user device 10. The programmatic resources for contextual information include the OS 12 of the user device. The CRMC 112 can generate calls to one or more context determination sources 96 of the OS 12 to retrieve the device contextual information 113, wherein the device contextual information includes contextual information that pertains to the text stream 111. The device contextual information 113 can include timestamps for when transcribed content appears on a display screen of the user device 10, or alternatively, for when rendered content is transcribed by the screen reader 92.

As an addition or variation, the device contextual information 113 can include identification of an application source of the display screen content (e.g., as may be generated by a voice assistant, web browser, note application, calendar, email or messaging application, SMS messaging application, social media application, etc.). Still further, as another addition or variation, the device contextual information 113 can include information that indicates a time duration or interval of the user session, where the user session measures the time during which the device is being used, and/or a particular application running on the device is being used.

Various additional types of device contextual information 113 can be retrieved and used as described with examples. For example, the OS 112 can retrieve a location of the device while the text steam 111 is being received, based on a satellite receiver (e.g., global positioning system receiver) of the user device 10. As another example, the device contextual information 113 can include information that indicates a device activity of the user, while the text stream 111 is being generated. The OS 112 can retrieve activity information, generated by the OS 12, indicating that the user may be operating a vehicle, or is being transported by a vehicle. The OS 112 may merge the device contextual information 113 with the text stream 111.

The processes represented by the term encounter component 120 utilize the text stream 111 and the device contextual information 113 to determine when term encounters occur, and to determine the presence of secondary terms, as well as meaningful contextual information regarding the term encounter.

Text Analysis

The text analysis component 120 includes processes for implementing operations represented by a term detector 122, term checker 124 and sentiment component 128. The term detector 122 can tokenize or parse the text stream 111, and further perform processes to compare terms of the text stream 111 with terms contained in the term logic library 106.

In examples, the term detector 122 detects candidate term encounters from the text stream. Each candidate term encounter can correspond to a term that matches to or is otherwise a likely reference to a term of interest of the term logic store 106. The term detector 122 can detect candidate term encounters by comparing individual tokens of the text stream 111 to entries of the term logic store 106. If the comparison yields a match, the identified token in the text stream 111 is deemed to be a candidate term encounter for the matched term of interest.

A candidate term encounter means one or more terms of the text stream 111 are deemed to be a match to a term of interest of the term logic store 106. The candidate term encounter can correspond to a near match (e.g., misspelling, phonetic alternative, etc.) to a term of interest. Still further, a candidate term encounter can detect a reference to a nickname for the term of interest, where the nickname is associated with the corresponding entry of the term logic store 106. By way of illustration, a nickname can correspond to any alternative identifier for a brand or product, such as in initial for compound brand name, a short form reference to the compound brand (e.g., 'Drizzle' for 'Hill Drizzle' brand of soda), or a dissimilar textual reference to a product or brand. More generally, the term detector 122 can detect a candidate term encounter when a comparison of the detected token does not precisely match primary term(s) of a term of interest, but the comparison is deemed sufficiently similar (e.g., only one character a letter of the term is different as between the two terms). In the case of compound terms of interest, a candidate term encounter can correspond to detection of at least one of the primary terms, such as the dominant marker term for the compound term of interest.

For each identified candidate term encounter, the term detector 122 extracts additional terms that are present in a portion of the text stream 111 that contained the candidate term. For example, for each candidate term encounter, the term detector 122 extracts a portion of the text stream 111 that contains the detected term (e.g., 20 terms that precede and follow the detected term in the text stream 111).

Term Encounter Determination

The term checker 124 performs operations to determine whether a candidate term encounter corresponds to a term of interest. If the candidate term encounter is a term of a compound term of interest, the term checker 124 can determine whether the other term(s) of the compound term of interest are present in a relevant portion of the text stream 111. If the candidate term encounter is determined to be a term of interest, then the term encounter component 120 records a term encounter 121 with an export data store, shown as term encounter store 125. The term encounter 121 can include each identified term of the corresponding entry. For compound terms of interest, the term encounter 121 includes each of the compound terms.

In some examples, the candidate term encounter can initially identify a dominant or primary term for a compound term of interest. When a dominant term is identified for a compound term of interest, the term checker accesses the corresponding entry of the term logic store 106 to determine the other term or terms of the compound term of interest. The term checker 124 then processes a corresponding portion of the text stream 111 where the dominant term was encountered, including a number of terms that precede and/or follow the dominant term, to determine whether the other term(s) of that compound term are present in the corresponding portion of the text stream. Accordingly, examples provide that the term encounter component 120 performs a search process that is optimized to identify compound terms of interest. In particular, examples provide that the processes of the term encounter component 120 only search for a compound term when the compound term's dominant term is detected in a text stream, and if the dominant term is not detected, the term encounter component 120 does not expend resources to detect whether the non-dominant term is present. Additionally, by first detecting a dominant term of a compound term of interest, then searching for the non-dominant term(s) in a relevant portion of the text stream, the term encounter component 120 is able to check for the presence of compound terms using a term-by-term comparison, where the space between terms is preserved as a delimiter, and the number of checks performed for detecting compound terms is minimized. This approach avoids the use of a rolling window methodology to detect compound terms, which would require a far greater number of checks to detect the presence of compound terms of interest.

In checking for compound terms, the term checker 124 can implement one or more of a proximity and/or sequencing condition for determining that the appearance of two primary terms are a reference to a compound term of interest. For example, the term checker 134 can use proximity and/or sequencing conditions to analyze a relevant portion of the text stream after a dominant term of a compound term of interest is detected, where the relevant portion corresponds to an X number of terms before and/or after the detected dominant term. The parameters for a proximity and/or sequencing condition can be implemented by default, or based on term-specific values, as stored in the term data store 106. By way of example, a proximity condition can be implemented as a parametric value that specifies a proximity threshold, defining the maximum term distance between the detected terms (e.g., number of words that separate the primary terms in the text stream). Similarly, the sequencing condition can specify an order in which primary terms of a compound term are to be encountered.

In examples, the term checker 124 can also implement logic to determine when a candidate term encounter is a likely reference to the corresponding term of interest, as opposed to, for example, an incidental reference to the primary term(s) (e.g., primary term used in alternative meaning than as proper noun and reference to brand or product). For example, a reference to a term of interest may only be of interest if the reference is to a brand or product usage (e.g. "Trump"). If the candidate term encounter is for a usage that is different than a reference to the brand (" . . . trump card . . . "), then the candidate term encounter is deemed to not be an actual term encounter. When a candidate term encounter is deemed to be a reference to the primary term(s) of interest, the corresponding term of interest can be said to have an encounter on the computing device 10. To evaluate the usage of the candidate term of interest, the term checker 124 can process the portion of the text stream that contains the candidate term encounter, for terms that support an intended usage of the corresponding term of interest. The terms that are deemed to support or validate a candidate term encounter can be predefined and associated with the respective entry of the term of interest in the term store 106. The usage of the candidate encounter can also be analyzed with a respective negating are contra terms. For example, the presence of a particular term in the relevant portion of the text stream 111 can weigh against the respective term of interest being used in a context that is intended by the term of interest (e.g., in the case of " . . . trump card", the term "card" negates the term "trump" as a reference to a political figure). The term logic store 106 can maintain validation logic (e.g., specific rules and data) that can determine or weigh the determination of whether a candidate term is a reference to a term of interest. The validation logic can be associated specifically for individual terms of interest, specifically for categories of terms of interest, or in some cases, globally with all terms of interest. The term checker 124 can retrieve and implement the appropriate logic 124 from, for example, the term logic store 106 when a candidate term is detected, in order to validate or not validate the candidate encounter as an actual encounter. Additionally, the term checker 124 can take into account additional determinations, such as presence of marker words for specific terms of interest (e.g., "President" as marker for "Trump"), the appearance of secondary terms and contextual determinations, when making a validation determination regarding a candidate encounter. In this way, each term encounter can correspond to a determination that a term of interest, as specified by the term logic store 106, was detected in the text stream 111, and further that the encountered term was an intended or actual reference to the term of interest.

Secondary Terms

The term checker 124 can also analyze the relevant portion of the text stream 111 to determine whether secondary terms for the matched term of interest are present. As mentioned, secondary terms can include descriptors, subcategories to a category defined by the candidate term encounter, or variants to items or products that are identified by a term of interest. Further, the detection of secondary terms can adhere to rules, such as a rule where a descriptor is to precede the identified term of interest. In examples, each entry of the term logic store 106 can associate one or more primary terms with one or more secondary terms. In response to detecting a candidate or actual term encounter, the term checker 124 can retrieve the secondary term(s) of the respective entry, and scan a relevant portion of the text stream (e.g., an M number of terms before and/or after the detected primary term). In this way, the term checker 124 can determine a term encounter 121, reflecting an instance of a term of interest in the rendered content of the user device 121, and further identify secondary terms (or reference thereto), where the secondary terms include descriptors or product variants that were identified by the term checker 124 in the text stream 111.

Contextual Determination

The term encounter component 120 can include a variety of processes (represented by context determinator 126) to determine one or more types of context for each term encounter. The contextual determinations can include inferences, made from the contents of the text stream 111, the device contextual information 113 and/or other sources. In examples, the context determination 126 represents processes that infer different types of contextual information for each term encounter. The context determinator 126 can include processes to determine a usage context for the relevant portion of the text stream 111 that contains a term counter. In some examples, the usage context can be determined by identifying preselected usage markers, corresponding to keywords, phrases and terms, where the preselected terms reflect a usage of interest for the term encounter. By way of illustration, for a term encounter that references a food or beverage by brand or product name, the preselected terms can reflect a marker of nutrition or health, (e.g., "unhealthy", "fat", "heart", etc.). As another illustration, for a term counter that references a type of vehicle by make and model, the preselected usage terms can include a marker of an attribute that is of interest amongst population of vehicle owners or purchasers, such as "mileage", "electric", "maintenance", "sexy", etc. The usage markers can be predetermined and associated with a categorical designation of a term of interest. For example, each term of the term logic store 106 can be associated with a set of categorical designations, and each of the categorical designations can be pre-associated with a library of usage markers. As an addition or alternative, usage markers can be specifically selected for individual terms of interest of the term logic store 106. The context determinator 126 can reference a detected primary term of the term encounter with the corresponding entry of the term logic store 106, in order to determine a set of usage markers that are associated with that term of interest. The context determinator 126 can scan a relevant portion of the text stream 111 (e.g., an N number of terms before and/or after the detected primary term) to determine whether any of the referenced usage markers are present.

In variations, the context determinator 126 can make a context determination based at least in part on a term proximity between the usage marker and a primary term of the term encounter. Additionally, the context determinator 126 can make a determination based at least in part on a sequencing or positioning of the usage marker relative to a primary term of the term encounter. If the context determinator 126 detects a usage marker that satisfies proximity, positioning and/or other conditions, then context determinator 126 associates the usage marker with the term encounter (e.g., as a tag or label).

In examples, the context determinator 126 can also determine a commercial context for a term encounter. The context determinator 126 can scan a relative portion of the text stream 111 for one or more markers of a particular commercial context. The markers of the particular commercial context can include, terms such as "advertisement", "sponsored", "promoted", and the like. If a marker reflecting commercial context is detected in the relevant portion of the text stream 111 containing the term encounter, then the context determinator 126 can associate the term encounter 121 with a corresponding label (e.g., "advertisement"). Conversely, if no marker reflecting commercial context is detected in the relevant portion of texting 111, then the term encounter 121 can be associated with a label that reflects this determination (e.g., "organic").

Still further, in examples, the context determinator can determine contextual information relating to a target computing activity undertaken by a user of the device 10 in conjunction with the detection of a term encounter 121. A target activity can be defined by a set of activity markers, corresponding to keywords, phrases or terms that were strong indicators of the target activity taking place. In examples, the target activity can correspond to a transaction activity, such as when a user of the device 10 makes a purchase online, as an item to shopping cart, subscribes to a free trial subscription, create a wish list or the like. For a transaction or purchasing activity, the activity markers can include, for example, "order", "buy", "delivered", "thank you for your purchase", "shipping address", "wallet" etc. The activity markers can be tuned for specific activities, such as purchasing activities that occur through use of the user devices electronic wallet, or particular type of purchasing activities. The activity markers can be applied globally to at least some terms of interest. Alternatively, the activity markers can be category and sub-category specific, based on the categorical designations of the term of interest in the term logic store 106. Still further, the activity markers can be specifically tailored for particular terms of interest.

In determining inferred contextual information, the context determinator 126 can utilize device contextual information 113, as provided by the OS 12 and/or other programmatic resources of the user device 10. For example, the context determinator 126 can perform processes for determining whether a term counter occurred in context of a target activity (e.g., online shopping) only when the device contextual information 113 indicates that a particular type of application was the source of the relevant text stream 111 (e.g., shopping application, browser, etc.). To illustrate, if the device context information 113 indicates that the source of the text stream 111 is a news application, then the context determinator 126 does not perform additional steps to determine whether a relevant portion of the text stream 111 includes markers for a target activity of online purchasing or transactions, as the occurrence of such marker terms are likely to have an alternative purpose (e.g., part of news story). However, if the device context information 113 indicates a source of the text stream 111 is a browser or shopping application, then the context determinator 126 performs an analysis on the relevant portion of the text stream 111 to determine whether markers for the target activity of online purchasing was detected. If the marker is detected, then the term encounter 121 is associated with a reference label of the target activity. In variations, if the target activity is closely related to the application that generated the text stream 111, then an indication that the marker for the target activity was not encountered may also be recorded. For example, a tag or label reflecting "no purchase" can be associated with a term encounter identified from a text stream 111 generated from a shopping application, where no marker for a transaction or purchase was detected in the relevant portion of the text stream 111.

In examples, the context determinator 126 can infer contextual determinations based in part on an application source or device source of the content from which the text stream 111 is generated. The context determinator 126 can determine the source device or application from the device context information 113. The source information can affirm or rule out context determinations. For example, if a context determination identifies a use of a term of interest to be an email, then the context determinator 126 can rule out that the term encounter 121 was commercial. Further, in examples, at least some of the type of inferred contextual information that the context determinator 126 determines can specifically be tailored for the application that is the source of the text stream 111. To illustrate, the occurrence of specific marker words reflecting commercial context (e.g., advertisement) can be ignored when the application generating the text stream 111 is an email application.

Sentiment Analysis

The term encounter component 120 includes processes represented by sentiment component 128 to perform sentiment analysis for each term encounter. For each term encounter, the sentiment component 128 analyzes a relevant portion of the text stream 111 to determine a sentiment of an encountered term of interest. In some examples, the determined sentiment is a binary determination, reflecting, for example, positive or negative, positive or not-positive, or negative or not negative. In variations, the sentiment determination can be a trinary determination, reflecting, for example, positive, negative or neutral. Still further, in additional examples, the sentiment determination can include additional values or dimensions, such as intensity (e.g., strong like or dislike). In examples, a positive usage can correspond to, for example, a determination that the usage reflects a positive sentiment of the user, such as in the case where the usage of the term of interest is something an end user likes or is appreciative of, wants, is satisfied with, is supportive of, and/or is happy or enthusiastic about. A negative usage can correspond to, for example, a determination that the usage reflects a negative sentiment of the user, such as in the case where the usage of the term of interest is something an end user dislikes, does not want, is unsatisfied with, not supportive of, is not happy about and/or enthusiastic about. The sentiment component 128 can assign a label reflecting the determined sentiment for the term encounter.

For purpose of sentiment analysis, the relevant portion of the text stream can be based on a predetermined process, which can be provided from the network system 200 or another source. In variations, the sentiment analysis is specific to the particular term, or particular type or category of term. For example, the term data 105 can include term specific logic for determining the sentiment of specific terms of interest.

Term Encounter Store

In examples, the term encounter component 120 records each term encounter in an export store, shown as term encounter store 125. Each term encounter 121 can be associated with a set of parametric information that correspond to, or is based on, the contextual determinations (e.g., labels for usage, standards, sentiment, etc.). Additionally, each term encounter 121 can be associated with any secondary terms that are identified from relevant portions of the text stream 111. Still further, each term encounter can be stored in association with a portion or segment (e.g., X number of words before or after the primary term) where a corresponding primary term was encountered. In examples, each term encounter 121 can be structured as an entry of a data structure, where the entry identifies the primary components of the corresponding term of interest, and any secondary terms, and inferred contextual determinations that are determined for the term encounter.

Communication Component

The processes represented by the communication component 130 include monitoring of the erm encounter store 125, and transmission of data packages 131 that include entries of the term encounter store 125 to a network system 200 (see FIG. 2). The communication component 130 can also include processes to encrypt or otherwise safeguard against transmission of information that is not anonymized. In examples, the processes described with the term detection system 100 can be encrypted to ensure that the information recorded and transmitted on the end user device remains secure and anonymized.

In examples, each transmission of the communication component 130 includes a number of entries of the term encounter store 125, where each entry identifies a term encounter 121, device contextual information 113 (e.g., timestamp for the term encounter, application from which the term encounter was detected, session time, etc.) determined for a time interval when the term encounter occurred, any determined secondary terms, and any parametric information reflecting inferred contextual determinations (including sentiment determinations). The communication component 130 can implement monitoring operations to monitor the additions of individual term encounters in between transmissions by the communication component 130. After each transmission, the term encounter store 125 can be flushed or reset. When a size of newly added entries, reflecting newly encountered terms, or term encounters added since the last time transmission by the communication component 130, exceeds a threshold value, the communication component 130 generates a new data transmission to the network system 200, where the new data transmission contains data representing each of the added entries. The threshold for triggering the communication component 130 to transmit newly added entries of the term encounter store 125 can be based on a number entries (e.g., 100 added entries, representing 100 term encounters), and/or a data size of the added entries. In this way, the communication component 130 can minimize the number of data transmissions that take place, thereby minimizing the power usage of term detection system 100.

As an addition or variation, the communication component 130 can transmit a data package that identifies additional entries to the term encounter store 125 at periodic time intervals, and/or in response to predetermined events (e.g., after each instance when an entry is added to the term encounter store 125).

Historical Search

In examples, the term logic store 106 is repeatedly updated over the course of a time interval that can span days, weeks or months. The updates to the term logic store 106 can include the addition of new entries, reflecting additional terms of interest. Once a new term of interest is added to the term logic store 106, the term encounter component 120 performs processes as described to detect whether the term is encountered on the display screen.

In some examples, the term detection system 100 can implement a historical search and analysis to determine whether a newly added term of interest was encountered on the device 10 in a prior time interval (e.g., preceding number of days, week or month etc.).

According to examples, when the text assistant interface 110 receives a text stream 111, the text assistant interface 110 can implement in parallel an additional process to cause the text stream 111 to be stored in historical data store 127. The text assistant interface 110 can record the text stream 111 in the historical data store 127 at the same time that the text stream is made available to and/or analyzed by the term encounter component 120. The historical data store 127 can continue to record text streams over an interval that can span days, weeks or months. Periodically, some or all of the contents can be flushed. Additionally, in some examples, the OS 112 can merge device contextual information 113 with the text stream 111 that is recorded in the historical data store 127.

In variations, the historical data store 127 can structure the text streams to optimize for a search process. For example, the text streams can be structured to include a searchable index.

When the term logic store 106 receives a newly added entry, the search component 128 searches the historical data store 127 for one or more primary terms of the newly added term of interest. A search process performed by the search component 128 can differ from the detection process performed by the term detector 122. In the search process, the corpus of texts data is searched specifically for the primary terms(s) of the newly added term of interest. By comparison, the process performed by the term detector 122 can compare individual tokens of an incoming text stream with one or more primary terms of individual terms of interest of the term logic store 106. However, as described with the term detector 122, search process performed by the search component 128 can account for misspellings, phonetic alternatives, nicknames and the like for a primary term of interest. When the search identifies a matched to a primary term, the search component 128 retrieves a portion of the text stream that contains the matched term. The matched term may then be analyzed as a candidate historical encounter 131, where the analysis utilizes or follows the processes described with the term encounter component 120. In this way, the historical term encounter 131 can, based on the determinations of the term encounter component 120, be associated with any of (i) one or more secondary terms included in the relevant portion of the text stream, (ii) one or more inferred contextual labels, and (iii) one or more sentiment determinations.

The term encounter component 120 can record the historical term encounter 131 in the term encounter store 125. In some variations, the communication component 130 can, upon the addition of the historical term encounter 131 to the term encounter store 125, retrieve and transmit a data package containing the historical term encounter 131 to the network system 200. In this way, a new term of interest can be added to the term logic store 106 from a remote source (e.g., network system), and in response to the new term of interest being communicated to the user device 10, the user device 10 can transmits back to the network system 200 information related to every instance of the term being encountered on the device during a prior time interval.

Network System

FIG. 2 illustrates an example network system 200, according to one or more embodiments. A network system 200 can be implemented on, for example, a server or combination of servers. The network system 200 operates to provide a term evaluation service that provides metrics regarding public awareness and perception of specific terms (or terms of interest), specifically by detecting when users of a population encounter terms of interest, and contextual information regarding the individual term encounters. The terms of interest can include brands, products, and names, as well as variants thereof. A user of the term evaluation service ("service user") can include, for example, a brand owner, an advertiser, a product researcher, a publicist or the like.

In examples, the network system 200 includes processes represented by user interface 210 for service users, user device interface 220 for communicating with user devices 10, and a term analysis component 230. The processes represented by the service user interface 210 communicates with individual computing devices 12 of service users, to receive terms of interest. As described with examples, the terms of interest can include brands, product names (and variants thereof), identifiers and more generally proper nouns. Additionally, the terms of interest can include compound terms, comprising multiple primary terms (e.g., "Mountain Craze"), and secondary terms can specify various to the primary terms (e.g., "Diet", "Cherry" for "Mountain Craze"). The user interface 210 records the terms of interest with the aggregate term encounter store 205. Further, service users can remove, modify or otherwise update the terms of interest through additional interactions.

The network system 200 can maintain one or more databases (collectively, "aggregate term encounter database 205") to record terms of interest, as supplied by service users, as well as to collect term encounter information (e.g., contextual determinations, including sentiment value, etc.), as communicated by user devices 10.

The network system 200 can communicate with a plurality of user devices 10 via corresponding device interfaces 220. In practice, the network system 200 communicates, via corresponding device interfaces 220, with numerous (e.g., thousands, hundreds of thousands, millions, etc.) user devices 10, to provide the term encounter service. An end user can elect to participate in the term encounter service by installing an instruction set (e.g., program, tool, application, etc.) on their respective user device 10. The instruction set can be provided directly in whole or in part through the network system 200. Alternatively, the instruction set can be provided indirectly through a third party. Still further, the network system 200 can communicate with the user devices 10 to provide logic that activates or otherwise enables the user device to perform processes, as described, for determining and communicating term encounter data.

Once a user device 10 is enabled to participate in the term encounter service, the user device 10 can receive a collection of terms of interest. The collection of terms can be retrieved from the aggregate term encounter data store 205 and transmitted to the user device 10 via the user device interface 220. Subsequently, as the aggregate term encounter store 205 is updated by the service user (e.g., additional of new terms of interest, removal of other terms of interest, modifications to existing terms of interest, etc.), processes represented by the term store manager 228 generate term data 215, representing the update to the aggregate term encounter store 205, and the term data 215 is transmitted to the user devices 10.

As described with FIG. 1, the user devices 10 of the population transmit data packages 135 to the network system 200, where the data packages include term encounter data 211 from the respective user device. The term analysis component 230 can include processes to decrypt and parse the data packages 135 received from the user devices 10. For each data transmission, the term analysis component 230 identifies an encountered term of interest, as well as identification of secondary terms and contextual determinations (as described with an example of FIG. 1). The term analysis component 230 records with the aggregate term encounter store 205 an entry that reflects the term encounter. The entry can identify the encountered term of interest, in association with the secondary terms and the contextual determinations.

The data packages 135 can also include corresponding device contextual information 113. The term store manager 128 can record, with the aggregate term encounter store 205, the corresponding device contextual information is association with the entry reflecting the term encounter.

In some examples, the data packages 135 communicated from the user devices 10 can also include relevant portions of the text stream that contained the corresponding term of interest. As an addition or variation, the data packages 135 can include a data representation of the portion of the text stream containing the encountered term, where the data representations identify primary and secondary terms to one another, keywords appearing in the relevant portion of the text stream, proximity data as between the primary and secondary terms and/or other terms, and/or sequencing data reflecting in order or sequence between individual terms of the relevant portion of the text stream.

The term analysis component 230 represents processes that analyze the data packages for a variety of purposes. In an example, the term analysis component 230 validates or invalidates the determination of a term encounter through additional analysis. In examples, the term analysis component 230 can perform a temporal analysis, by for example, identifying timestamps (e.g., from the device contextual information) reflecting moments in time when primary terms of a compound term of interest were encountered on a corresponding user device. If the time interval between when the primary terms were encountered is in excess of a threshold, the term analysis component 230 can invalidate the determination of the term encounter.

The term analysis component 230 can also analyze a relevant text stream (or portion thereof) of a term encounter for secondary terms that are markers for a variant of term of interest. For example, where a term of interest is a brand of a product, the variant can be a particular type of product with the same brand. As specific examples, a brand of soda (e.g., "Craze" brand soda) can include a sugar-free variant (e.g., "Sugar-Free Craze"), a lemon-flavored variant (e.g., "Lemon Craze" soda), a sugar-free lemon-flavored variant (e.g., "Cherry Craze" soda), a cherry-flavored variant (e.g., "Cherry Craze" soda), and a sugar-free cherry flavored variant (e.g., "Sugar-Free Cherry Craze" soda). For example, a secondary term can specify a variety to a product or brand. The term analysis component 230 may access a category dictionary 215 that relates specific brand-variety proper nouns to variety-indicative words that may be present in the text stream. The term analysis component 230 can utilize the category dictionary 215 to identify instances when a combination or sequence of secondary terms for a term of interest is present in the relevant portion of the text stream. As an illustrative, in the case of "Craze", the presence of "sugar", "free" and "Craze" may be determined to be a reference to "sugar free Craze". In this way, the term analysis component 230 can augment or modify the term encounter data 211 provided with a data package to include additional sequenced or combine secondary terms.

In examples, the term analysis component 230 can also include term inference logic 232 for inferring that a term, or combination of terms in a portion of a text stream, is a reference to a term of interest, and in further examples, a reference to a variant of the term of interest. The inference logic 232 can include dictionaries (e.g., alternative term dictionaries), rules and heuristics, and/or predictive models.

In an example, the term analysis component 230 can implement inference logic 232 to identify instances when one or more terms of the text stream are actually, or likely, a non-explicit reference to a term of interest, or primary term thereof. In an example, the inference logic 232 can include a list of alternative terms including misspellings, abbreviations, nicknames, phonetic variations (e.g., dialect variations) and/or misuses for primary terms and/or secondary terms. The alternative term library can equate alternative words for (i) specific terms of interest (e.g., primary terms, secondary terms, etc.), and/or (ii) terms that are common to multiple terms of interest (e.g., "pop" for "soda"). The term analysis component 230 can implement the inference logic 232 to map, using, for example, one or more alternative dictionaries, a term that is not otherwise listed with an entry of the term logic store 106, to a primary term of the interest. As an illustrative example, the terms "craze" and "soda" (or "pop") can be determined as an inference to "Crazeola" or "Crazeola Soda".

As an addition or variation, the term analysis component 230 implements the inference logic 232 to determine when one or more terms of the text stream are a partial reference to a term of interest, meaning at least one primary term of the term of interest is absent in the text stream. In additional variations, the term analysis component 230 implements the inference logic 232 to determine when terms of the text stream are a partial reference to a variant of a term of interest. Accordingly, in examples, the term analysis component 230 can implement the inference logic 232 to make a determination as whether (i) a presence of a dominant primary term of a compound term of interest is a reference to the compound primary term of interest, when no non-dominant primary terms of interest are present in the text stream; (ii) a presence of a dominant primary term and at least one non-dominant primary term of a compound term of interest is a reference to the compound primary term of interest where one or more primary terms are absent; and/or (iii) the presence of a subset of secondary terms of a term of interest, are a reference to a particular variant of a term of interest, when all of the secondary terms of the variant and/or primary terms for the term of interest are not present in the text stream. Such determinations can be based on, for example, the number of primary and/or secondary terms that are identified in the text stream for the term of interest, the distinctiveness or commonality of the identified primary and/or secondary terms, and/or the sequence or ordering as between the identified terms, the proximity of the identified terms with respect to one another in the text stream (e.g., term spacing between two secondary terms), and/or the presence of markers or category terms (e.g., as provided by category dictionary) that make more likely that the presence of the combination of terms are a reference to a term of interest or variant thereof. In this way, the term analysis component 230 can implement the inference logic 232 to determine when end users are making an informal or less-than-exact reference to a particular term of interest, or variant thereof, such as may occur in non-commercial content (e.g., such as in user-generated content).

The inference logic 232 can also enable the term analysis component 230 to identify compound terms of interest and/or variants when the respective primary and/or secondary terms appear in the text stream appear out-of-order and/or spaced differently as compared to the order/spacing as compared to a proper usage of the term of interest. For example, the inference logic 232 can identify a reference to a term of interest ("Craze Soda") in a portion of a text stream where the ordering of the primary terms is reversed (e.g., "I will have some soda, Craze please,") as compared to the proper usage. Likewise, the inference logic 232 can identify a term of interest (e.g., "Craze Soda") in a portion of a text stream where the ordering of the primary terms is reversed and spaced apart as compared to the proper listing of the term of entry (e.g., identifying "I need soda, do you have Craze here?" as a reference to Craze Soda).

Similarly, the inference logic 232 can be used to identify a reference to a variant of a term of interest when the terms of the variant include missing terms, terms that are out-of-order, and/or terms that are spaced apart from one another. For example, the inference logic 232 can enable the term analysis component 230 to identify a variant of a compound term of interest when the text stream includes (i) one or more primary terms and a secondary term, but is missing one or more terms (e.g., "lemon craze" in text entry is mapped to "Lemon Craze Soda", "Cherry Craze" in text stream is mapped to "Wild Cherry Craze Soda", etc.); and/or (ii) one or more secondary terms that are out-of-order or positioned apart from the proper listing of the variant (e.g., "Cherry Wild" in text stream is mapped to "Wild Cherry Craze"; "cherry flavor craze" is mapped to "Wild Cherry Craze", etc.).

In making the determinations, the inference logic 232 can utilize timestamps and/or other metadata included in the device contextual information 113, accompanying the corresponding text stream that is being analyzed. The inference logic 232 can use the timestamps and/or other device contextual information to determine when terms of a text stream are part of a same context. For example, the terms of a text stream can be determined to be part of a same context when (i) the terms appear on a display screen at about same time (e.g., terms appeared within a threshold time interval (e.g., one minute) of one another); (ii) the text stream that is being analyzed is provided from display screen content that is generated by a same application running on the user device; and/or (iii) the text stream that is being analyzed is provided from display screen content that is generated by a same user session. In examples, the timestamps and/or other metadata can be used to validate a determination that terms of a text stream or a reference to a term of interest or variant thereof. Alternatively, the timestamps and/or other metadata can be used to invalidate a prior determination (made on either user device 10 or network system 200) that terms of a text stream are a reference to a term of interest or variant thereof.

In variations, the term analysis component 230 can also perform processes for determining contextual labels for term encounters. In an example, processes described with the term detection system 100 for inferring contextual information about the use of the encountered term can alternatively be implemented by the network system 200.

The term store manager 228 can update the aggregate term encounter store 205 based on the term encounter data 211 provided by the user devices and/or the determinations of the term analysis component. The aggregate term encounter store 205 can maintain a term encounter data structure that associates individual terms of interest with (i) device contextual information 112, obtained at or for the time the term was encountered in displayed content, (ii) secondary terms that were within a threshold proximity to a primary term in the relevant portion of the text stream, and (iii) one or more contextual determinations (e.g., whether the term of interest was encountered as part of a promotional content, or organic; sentimental score or value, etc.).

In examples, the network system 200 includes a report generator 240 that is available for service users. The service users can use the report generator 240 to generate reports that aggregate, for example, term encounters, and to query for specific results. For example, a query can be generated to identify a number of term encounters for a particular term of interest, where the context was organic (e.g., not commercial). To further illustrate, the report generator 140 can generate, for a particular term of interest, visualizations that (i) compare organic versus commercial term encounters, and (ii) measure sentiment for organic term encounters.

Methodology

Figure 3A:
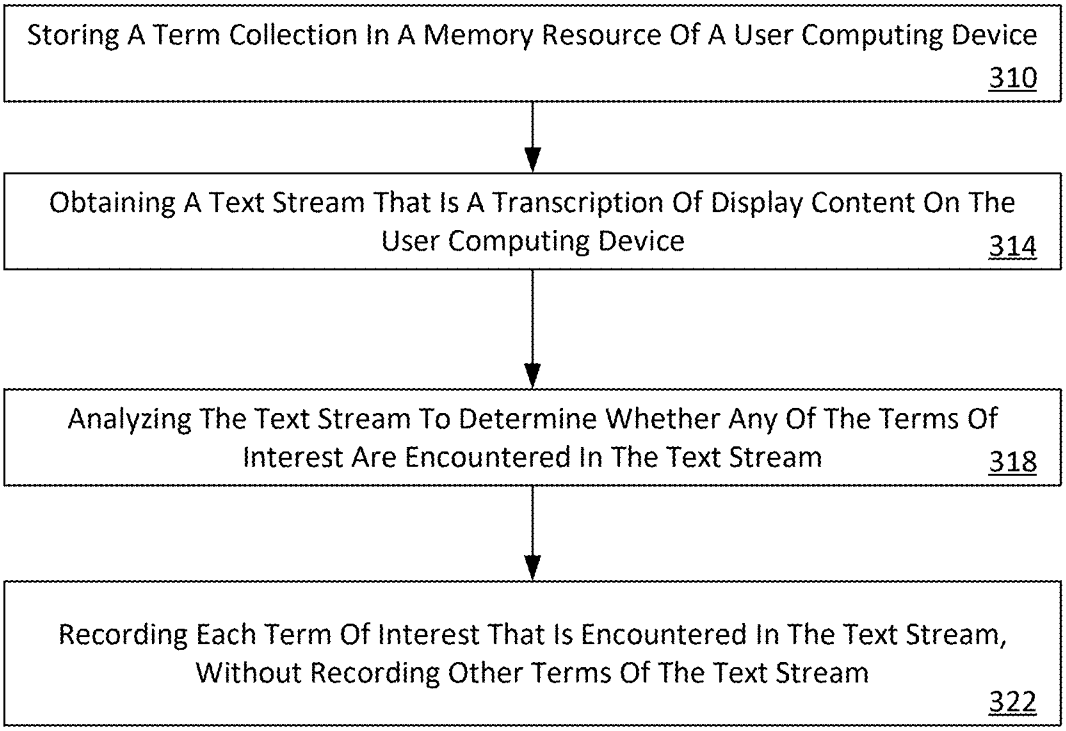
FIG. 3A through FIG. 3C illustrate example methods for determining term encounters on user devices, according to one more embodiments.
Figure 3B:
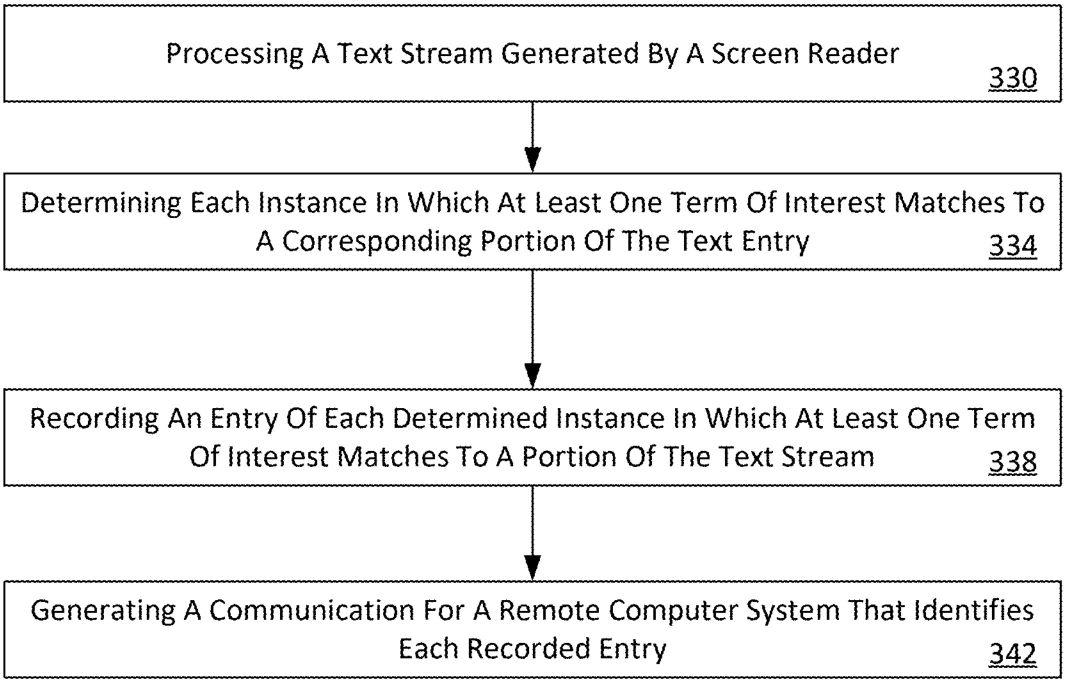
Figure 3C:
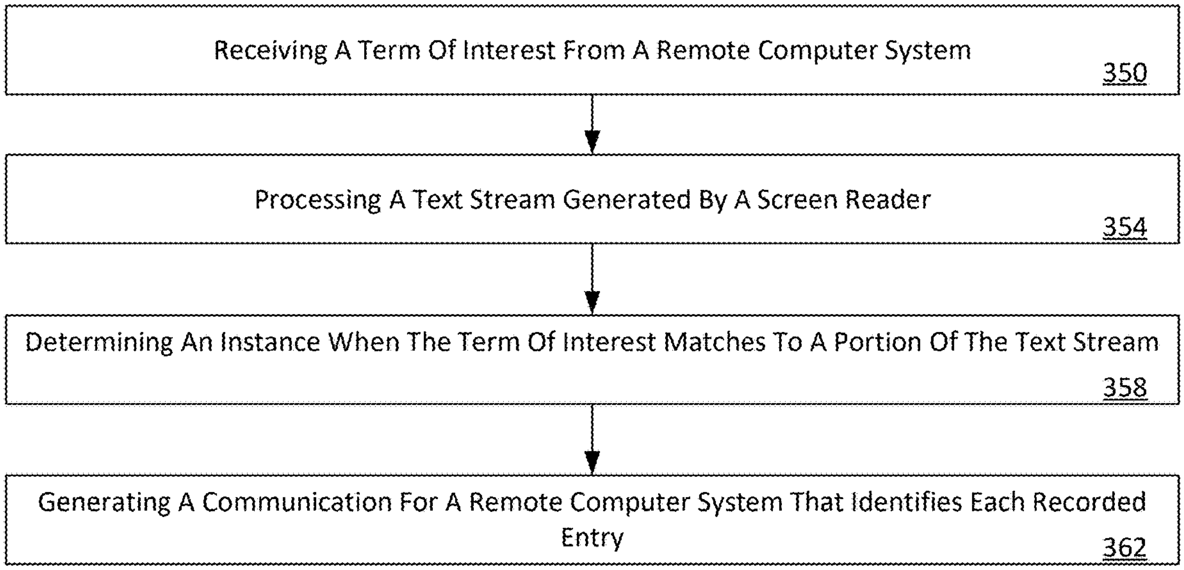
Figure 3D:
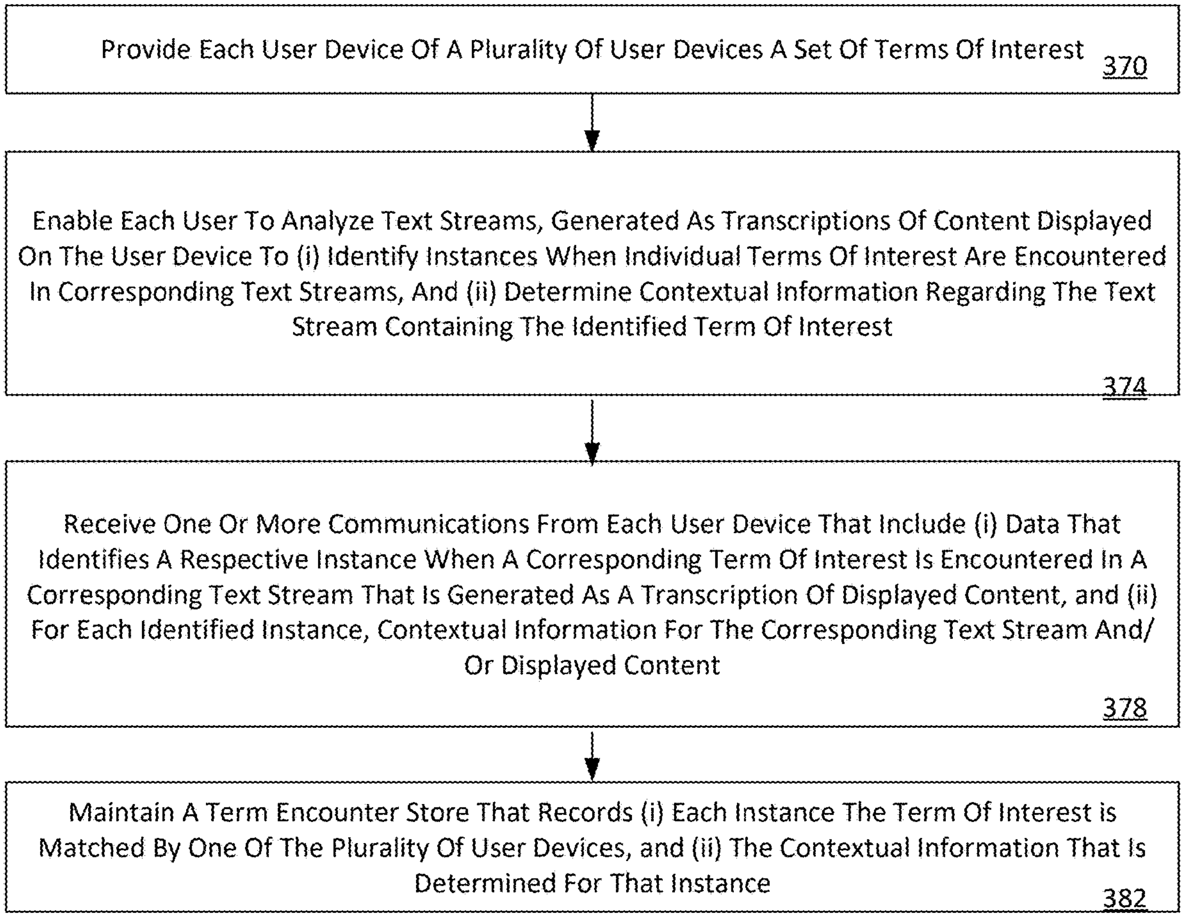
FIG. 3D illustrate example methods for obtaining term encounter information from a plurality of users, according to one or more embodiments.

FIG. 3A through FIG. 3C illustrate example methods for determining term encounters on user devices. FIG. 3D illustrate example methods for obtaining term encounter information from a plurality of users, according to one or more embodiments. In describing the example methods, reference may be made to elements of FIG. 1 or FIG. 2 for purpose of illustrating a suitable functionality or configuration for performing a step or sub-step being described.

With reference to FIG. 3A, in step 310, a collection of terms of interest is stored in the memory resource of a user device 10. As described with examples, the terms of interest can include brands, product names and other types of publicly recognizable identifiers. The user device 10 can communicate with an external source, such as the network system 200, to receive the terms of interest, and further to receive updates to the collection.

In step 314, the user device 10 obtains a text stream that is generated by a programmatic component of the user device (e.g., screen reader). As described with other examples, the text stream can correspond to a text transcription of the displayed content on the user device. For example, the text stream can be obtained from a screen reader that is part of the OS of the user device, where the screen reader transcribes displayed text content for purpose of facilitating the visually impaired. In examples, a program or application represented by the term detection system 100 can issue calls or otherwise interface with the OS of the user device to obtain the text stream from a screen reader.

In step 318, the text stream is analyzed to determine whether any of the terms of interest of the collection are encountered in the text stream. As described with examples, encountered term may be determined when the portion of the text stream matches to a term of interest. In some examples, an encountered term can correspond to a portion of the text stream that matches to a term of interest, and which is further determined to be an intended reference to the term of interest. Still further, in some examples, a term of interest can be a compound term containing one or multiple primary terms. When one of the primary terms detected in the text stream, further analysis can identify the compound term of interest, and the encountered term can correspond to the compound term of interest.

In step 322, the term encounter is stored in an export data store in the memory resources. As described with examples, the term detection system 100 can perform additional analysis to identify secondary terms and contextual determinations (including sentiment score). In this way, examples provide that the term encounter can be associated with any of one or more secondary terms, one or more types of inferred context, and/or the sentiment value. Additionally, the term encounter can be stored with the device contextual information 113, as generated by the user device 10 for the time when the text stream containing the term encounter is generated. While examples are described where the secondary terms and contextual determinations are made on the user device 10, in variations, some of the processes can be performed by components that reside with the network system 200.

With reference to an example of FIG. 3B, in step 330, a text stream, generated by a screen reader that operates on the user device, is processed, where the text stream is generated in connection with a display component of the computing device displaying one or more content items during a user session. The text stream can include or correspond to a transcription of a displayed or rendered content.

In step 334, an instance in which a term of interest matches to a corresponding portion of the text stream is determined. As described with other examples, the user device can store a set or collection of terms of interest.

In step 338, an entry is recorded in an export store reflecting a term encounter-meaning an instance in which the term of interest was deemed to match portion of the text stream. Over time, the export store can accumulate instances when terms of interest are encountered in a portion of the text stream.

In step 342, a communication is generated for a remote computer system, where the communication identifies each recorded entry of the export store. The communication can be generated when the number of entries exceeds a threshold number or size. Upon transmission of the communication, the export store can be purged, such that the export store only contains entries that have not been transmitted to the remote computing system (e.g., network system 200).

With reference to FIG. 3C, in step 350, a user device 10 receives a term of interest from a remote source (e.g., network system 200). The term of interest can include one or more primary terms, and optionally, a set of secondary terms. Further, the communication from the remote source can include logic (e.g., heuristics or rules) for determining contextual information about the term of interest.

In step 354, the user device processes a text stream generated by a screen reader that operates on the user device. The text stream can include or correspond to a transcription of a displayed or rendered content. The display screen content can be generated by any one of a plurality of applications running on the device. Further, the display screen content can include content the user views from other users (e.g., social media), content the user generated (e.g., composing message or post for social media, adding entry to to-do list, note, etc.), and content generated by third-parties (e.g., web content, news, commercial content, etc.).

In step 358, an instance in which the term of interest matches to a portion of the text stream is determined on the user device. The matching can identify a version of one or more primary terms of interest that match to a term in a text stream 111.

In step 362, a communication is transmitted, over one or more networks, to the network system 200, where the communication includes term encounter information about the determined instance. The communication can be transmitted in response to a determination that a threshold number of term encounters have been identified on the user device.

With reference to FIG. 3D, in step 370, the network system 200 provides each user device of a plurality of users devices a set of terms of interest. The set of terms can include compound terms, singular terms, and primary term(s) that include secondary terms.

In step 374, each user device is enabled to participate in a term encounter service provided by the network system 200. The network system 200 can enable each user device to analyze text streams to (i) identify instances when individual terms of interest are encountered in corresponding text streams, and (ii) determine contextual information regarding the text stream containing the identified term of interest. For example, the network system 200 can provide each user device 10 with programmatic resources 203 (e.g., executable instructions, data and/or other logic) to implement some or all of the processes described with the term detection system 100.

In step 378, the network system 100 receives one or more communications form each user device, where the communications include (i) data that identifies a representative instance when a corresponding term of interest is encountered in a corresponding text stream that is generated as a transcription of displayed content, and (ii) for each identified instance, contextual information for the corresponding text stream and/or displayed content.

In step 382, the network system 200 maintains an aggregate term encounter data store 205 that maintains, based on the term encounter data received from the user devices, individual instances when terms of interests are encountered on user devices of the population. Each instance of a term encounter can associate the term of interest with contextual information that is determined for that instance, secondary terms and other information reflecting the term encounter.

Hardware System

Figure 4:
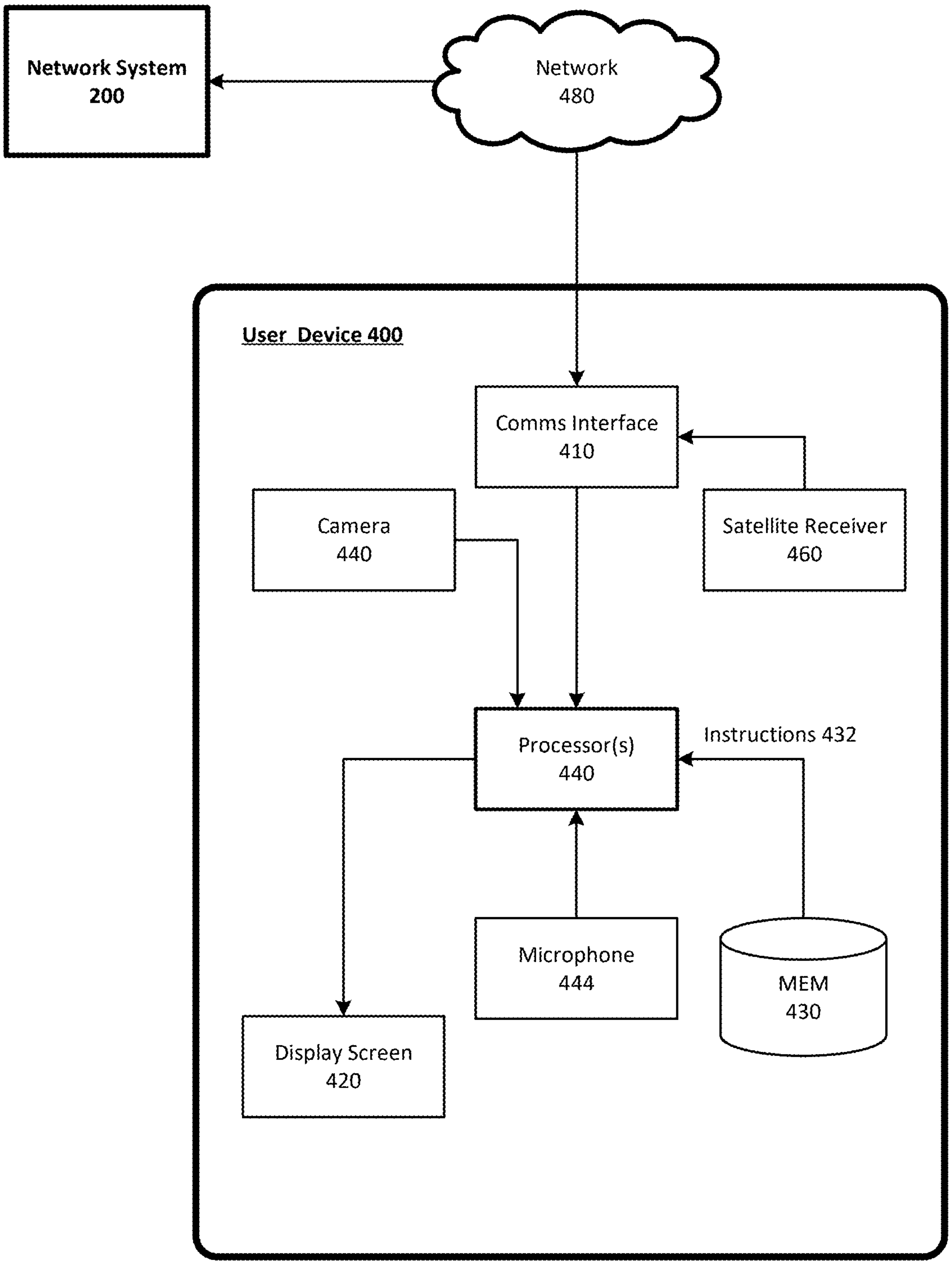
FIG. 4 is a block diagram illustrating an example user device on which an example term detection system can be implemented, according to one or more embodiments.

FIG. 4 is a block diagram illustrating an example user device on which a term detection system 100 can be implemented, according to one or more embodiments. In many implementations, the user device 400 can comprise a mobile computing device, such as a smartphone, tablet computer, laptop computer, smartwatch, VR or AR headset device, and the like. As such, the user device 400 can include features such as a display screen 420, a microphone 445, and a camera 450. The user device 400 includes a communication interface 410 to communicate with external entities such as the network system 200 (FIG. 2), using any number of communication protocols. In certain aspects, the user device 400 can store an operating system and in a local memory 430. In variations, the memory 430 can store additional applications executable by one or more processors 440 of the user device 400, enabling access and interaction with one or more host servers over one or more networks 480.

According to embodiments, the user device 400 includes a display screen 420 which can receive user inputs 418. The user inputs 418 can be received by the user device 400 via touch input on the screen 420 or via one or more peripheral devices (e.g., a mouse, a keyboard, etc.) coupled to the user device 400. Further, the communication interface 410 can be used to communicate, over one or more networks 480, with the network system 200.

The memory can store instructions 411 for implementing the term detection system 100. When executed by the one or more processors 440, the instructions cause the user device to implement term detection system 100 and to perform related operations as described with examples. The memory 430 can also include instructions for implementing a text assist component, such as a screen readers, which generate text streams from content displayed on the display screen 420. The text stream can be generated from display screen content (i.e., content displayed on the display screen 430). The source of the display screen content can include applications executed by the processor(s). The display screen content can also include user-generated content, such as may be generated through an input device (e.g., keyboard, microphone), as well as images captured by the camera 440.

Figure 5:
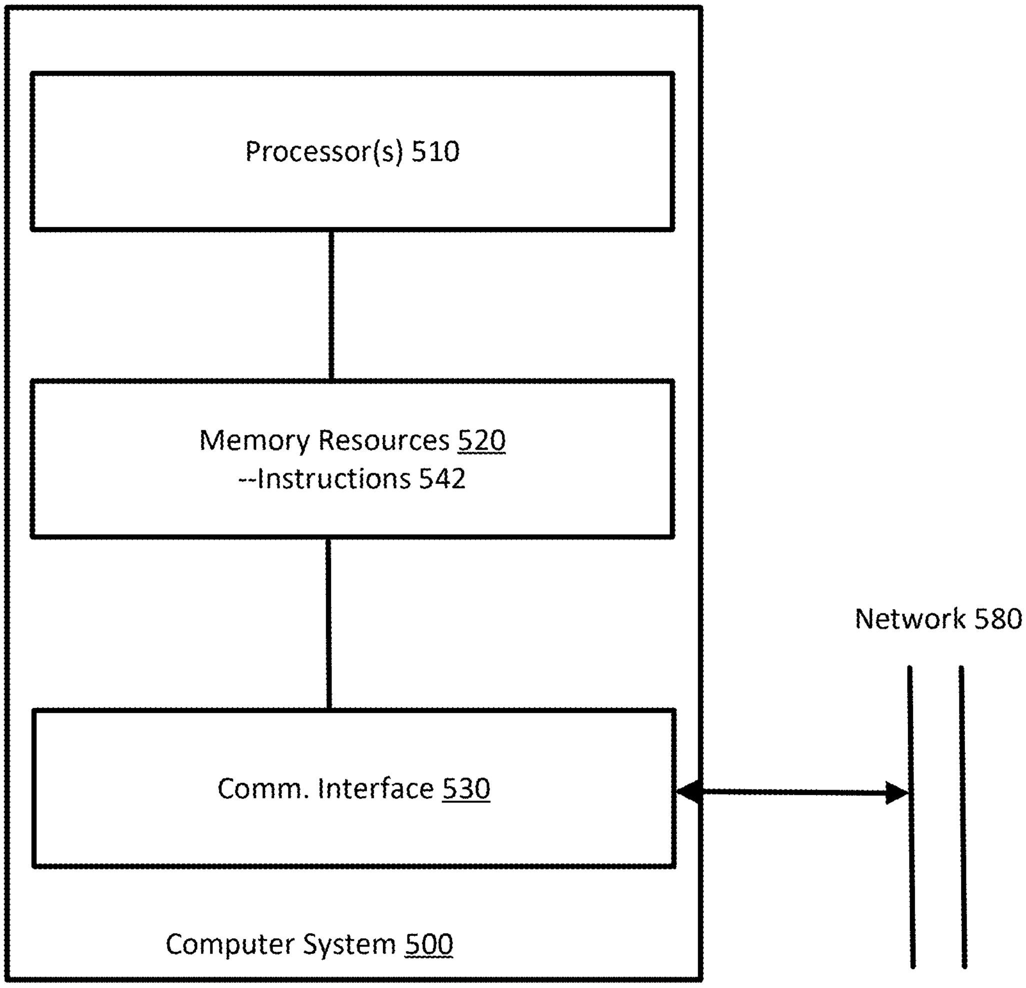
FIG. 5 is a block diagram that illustrates a network computing system upon which an example network system can be implemented, according to one or more embodiments.

FIG. 5 is a block diagram that illustrates a network computing system upon which a network system 200 can be implemented, according to one or more embodiments. A network system 200 such as described an example of FIG. 2 can be implemented using a computing system 500 of FIG. 5.

In one implementation, the computing system 500 includes one or more processors 510, memory resources 520, and a communication interface 530. The computer system 500 includes at least one processor 510 for processing information. The memory resources 520 may include a random access memory (RAM) or other dynamic storage device, for storing information and instructions to be executed by the processor(s) 510. The memory resources 520 also may be used for storing temporary variables or other intermediate information during execution of instructions to be executed by the processor(s) 510. The computer system 500 may also include other forms of memory resources, such as static storage devices for storing static information and instructions for the processor 510. The memory resources 520 can store information and instructions, including instructions 542 for implementing the term encounter service, as described with the network system 200.

The communication interface 530 can enable the computer system 500 to communicate with one or more networks 580 (e.g., cellular network) through use of the network link (wireless or wireline). Using the network link, the computer system 500 can communicate with one or more other computing devices and/or one or more other servers or data centers. In some variations, the computer system 500 can receive service requests from requester devices via the network link 580. Additionally, the computer system 500 can receive information from provider devices, from which forecasts of provisioning levels, location bias and other aspects described herein may be determined.

Examples described herein are related to the use of the computer system 500 for implementing the techniques described herein. According to one embodiment, those techniques are performed by the computer system 500 in response to the processor 510 executing one or more sequences of one or more instructions contained in the memory resource 520. Such instructions may be read into a main memory from another machine-readable medium, such as a storage device. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A non-transitory computer-readable medium that stores instructions, which when executed by one or more processors of a computing device, cause the computing device to perform operations comprising:

processing a text stream generated by a screen reader that operates on the computing device, the screen reader generating the text stream in connection with a display component of the computing device rendering one or more content items during a user session;

determining each instance in which at least one term of interest matches to a corresponding portion of the text stream;

recording an entry for each determined instance, each recorded entry identifying the at least one matched term of interest;

generating a communication for a remote computer system that identifies each recorded entry; and determining contextual information for each instance in which the at least one term of interest matches to the corresponding portion of the text stream; and wherein each recorded entry includes contextual information determined for the instance of that recorded entry.

2. The non-transitory computer-readable medium of claim 1, wherein determining the contextual information includes determining device contextual information generated by an operating system of the computing device, the device contextual information including a time stamp and an identifier of an application that generates the content items rendered by the display component.

3. The non-transitory computer-readable medium of claim 1, wherein determining the contextual information includes inferentially determining contextual information for the at least one matched term of interest, based at least in part on additional terms included in a portion of the text stream that contains the at least one matched term of interest.

4. The non-transitory computer-readable medium of claim 3, wherein the inferentially determining contextual information includes performing a sentiment analysis for the at least one matched term of interest, using the additional terms included in the portion of the text stream, to determine a sentiment score, the inferentially determined contextual information including the sentiment score.

5. The non-transitory computer-readable medium of claim 3, wherein the inferentially determining contextual information for one or more recorded entries includes identifying a presence of a contextual marker in the text stream.

6. The non-transitory computer-readable medium of claim 5, wherein the contextual marker includes a predetermined term that is indicative of a corresponding content item that is being rendered on the display component as commercial content, and wherein the inferentially determining contextual information indicates whether or not the at least one matched term is commercial content.

7. The non-transitory computer-readable medium of claim 1, wherein the operations further comprise:

storing, in memory, a collection of terms of interest; and wherein determining each instance in which the at least one term of interest matches to the corresponding portion of the text stream is performed for multiple terms of interest of the collection of terms of interest.

8. The non-transitory computer-readable medium of claim 1, wherein processing the text stream includes performing a function call to obtain the text stream from the screen reader.

9. A non-transitory computer-readable medium that stores instructions, which when executed by one or more processors of a computing device, cause the computing device to perform operations comprising:

processing a text stream generated by a screen reader that operates on the computing device, the screen reader generating the text stream in connection with a display component of the computing device rendering one or more content items during a user session;

determining each instance in which at least one term of interest matches to a corresponding portion of the text stream;

recording an entry for each determined instance, each recorded entry identifying the at least one matched term of interest;

generating a communication for a remote computer system that identifies each recorded entry;

wherein processing the text stream includes storing a historical data store that includes the text stream, and wherein determining each instance in which the at least one term of interest matches to the corresponding portion of the text stream includes determining whether the at least one term of interest matches to a portion of the text stream as stored with the historical data store.

10. The non-transitory computer-readable medium of claim 9, wherein the operations further comprise:

receiving the at least one term of interest from the remote computer system; and wherein determining each instance in which the at least one term of interest matches to the corresponding portion of the text stream includes performing a search of the historical data store for the at least one term of interest.

11. The non-transitory computer-readable medium of claim 10, wherein generating the communication for the remote computer system is performed in response to receiving the at least one term of interest from the remote computer system.

12. A non-transitory computer-readable medium that stores instructions, which when executed by one or more processors of a computing device, cause the computing device to perform operations comprising:

processing a text stream generated by a screen reader that operates on the computing device, the screen reader generating the text stream in connection with a display component of the computing device rendering one or more content items during a user session;

determining each instance in which at least one term of interest matches to a corresponding portion of the text stream;

recording an entry for each determined instance, each recorded entry identifying the at least one matched term of interest;

generating a communication for a remote computer system that identifies each recorded entry;

preparing a data set for the communication, the data set including or being based on each recorded entry;

detecting when a sizing parameter of the data set exceeds a predetermined threshold; and wherein generating the communication is performed in response to detecting the sizing parameter of the data set exceeds the predetermined threshold.

13. The non-transitory computer-readable medium of claim 12, wherein the communication is encrypted and structured to be anonymous upon receipt by the remote computer system.

14. A computer-implemented method for operating a computing device of a user, the method comprising:

receiving a term of interest from a remote computer system;

processing a text stream generated by a screen reader that operates on the computing device, the screen reader generating the text stream in connection with a display component of the computing device rendering a corresponding content during a user session;

determining an instance in which the term of interest matches to a portion of the text stream;

generating a communication for the remote computer system that includes information about the determined instance; and storing a historical data store that includes a collection of text streams, the collection of text streams being generated by a screen reader that operates to transcribe text for display content generated by any one of a plurality of applications operating on the device during a prior time interval, and wherein determining each instance in which at least one term of interest matches to a corresponding portion of the text stream includes determining whether at least one term of interest matches to a portion of one of the text streams of the collection.

15. The method of claim 14, wherein the communication is generated in response to receiving the term of interest from the remote computer system.

16. The method of claim 14, wherein the method further comprises:

obtaining device contextual information, including (i) time stamps for each text stream of the collection, the timestamps indicating when the text stream is generated, and (ii) application source information for a generated text stream; and associating the collection of text streams with the device contextual information based on the timestamps.

17. The method of claim 14, wherein upon determining the instance in which the term of interest matches to the portion of the text stream, the method further comprises:

analyzing the portion of the text stream to determine at least one of: (i) one or more secondary terms; (ii) one or more contextual attributes relating to the corresponding content of the text stream; and/or (iii) a sentiment score for the portion of the text stream.

* * * * *